United States Patent [19]

Depenbrock et al.

[11] Patent Number: 5,610,485

[45] Date of Patent: Mar. 11, 1997

[54] METHOD FOR CONTROLLING THE TORQUE OF AN ASYNCHRONOUS MACHINE

[75] Inventors: Manfred Depenbrock; Dieter Maischak, both of Bochum, Germany

[73] Assignee: ABB Patent GmbH, Mannheim, Germany

[21] Appl. No.: 409,136

[22] Filed: Mar. 23, 1995

[30] Foreign Application Priority Data

Mar. 23, 1994 [DE] Germany ........................... 44 09 936.3
Apr. 15, 1994 [DE] Germany ........................... 44 13 153.4

[51] Int. Cl.[6] .................................................. H02P 7/00
[52] U.S. Cl. ........................ 318/432; 318/802; 318/811
[58] Field of Search ................................... 318/432, 434, 318/798–812

[56] References Cited

U.S. PATENT DOCUMENTS

| | | | |
|---|---|---|---|
| 4,862,054 | 8/1989 | Schauder | 318/805 X |
| 5,023,538 | 6/1991 | Mutoh et al. | 318/811 |
| 5,119,007 | 6/1992 | Tunehiro et al. | 318/811 |
| 5,334,923 | 8/1994 | Lorenz et al. | 318/805 |
| 5,357,181 | 10/1994 | Mutoh et al. | 318/811 |
| 5,481,173 | 1/1996 | Yamamoto | 318/801 |

OTHER PUBLICATIONS

IEEE Proceedings of the IECON' 93 Intern. Conference on Industrial Electrics . . . , 1993, pp. 1991–1996, "An Induction Machine Servo with on Current . . . ".

IEEE Transaction on Power Electronics Publ. , vol. 3, No. 4 Oct. 1988, pp. 420–429, "Direct Self–Control (DSC) of . . . ".

IEEE Conference Record of the 1990 IEEE Industry Appl. 1990, pp. 410–415, "A Low Cost Stator Flux Oriented . . . ".

Primary Examiner—David S. Martin
Attorney, Agent, or Firm—Herbert L. Lerner; Laurence A. Greenberg

[57] ABSTRACT

A method for controlling the torque of a squirrel-cage rotor asynchronous machine supplied by an inverter driven by pulse-width modulation, includes converting a desired torque value ($M_{des}$) and an actual torque value ($M$) in accordance with $$\omega_{rdes} = \frac{2R_r}{3} \cdot \frac{M_{des}}{|\Psi_r|^2}$$

and $$\omega_r = \frac{2R_r}{3} \cdot \frac{M}{|\Psi_r|^2}$$

into a corresponding desired value ($x_{rdes}$) of a rotor angular frequency and a rotor angular frequency ($\omega_r$). The torque is controlled through a rotor frequency controller and a controller of an absolute value of a total flux in accordance with $$e_{sy} = V_M \cdot (\omega_{rdes} - \omega_r) + \frac{1}{\tau_M} \cdot \int(\omega_{rdes} - \omega_r)dt$$

and $$e_{sx} = V_\Psi \cdot (\Psi_{des} - |\underline{\Psi}\mu|) + \frac{1}{\tau_\Psi} \cdot \int(\Psi_{des} - |\underline{\Psi}\mu|)dt$$

In these equations:
- $R_r$ = rotor resistance;
- $\underline{\Psi}_r$ = rotor flux space vector;
- $e_{sy}$ = stator frequency factor;
- $e_{sx}$ = flux correction factor;
- $V_M$, $v\psi$ = P gains of the controllers;
- $\tau_M$, $\tau_W$ = reset times of the controllers;
- $W_{des}$ = desired value of total flux; and
- $\underline{W}_\mu$ = total flux space vector.

10 Claims, 6 Drawing Sheets

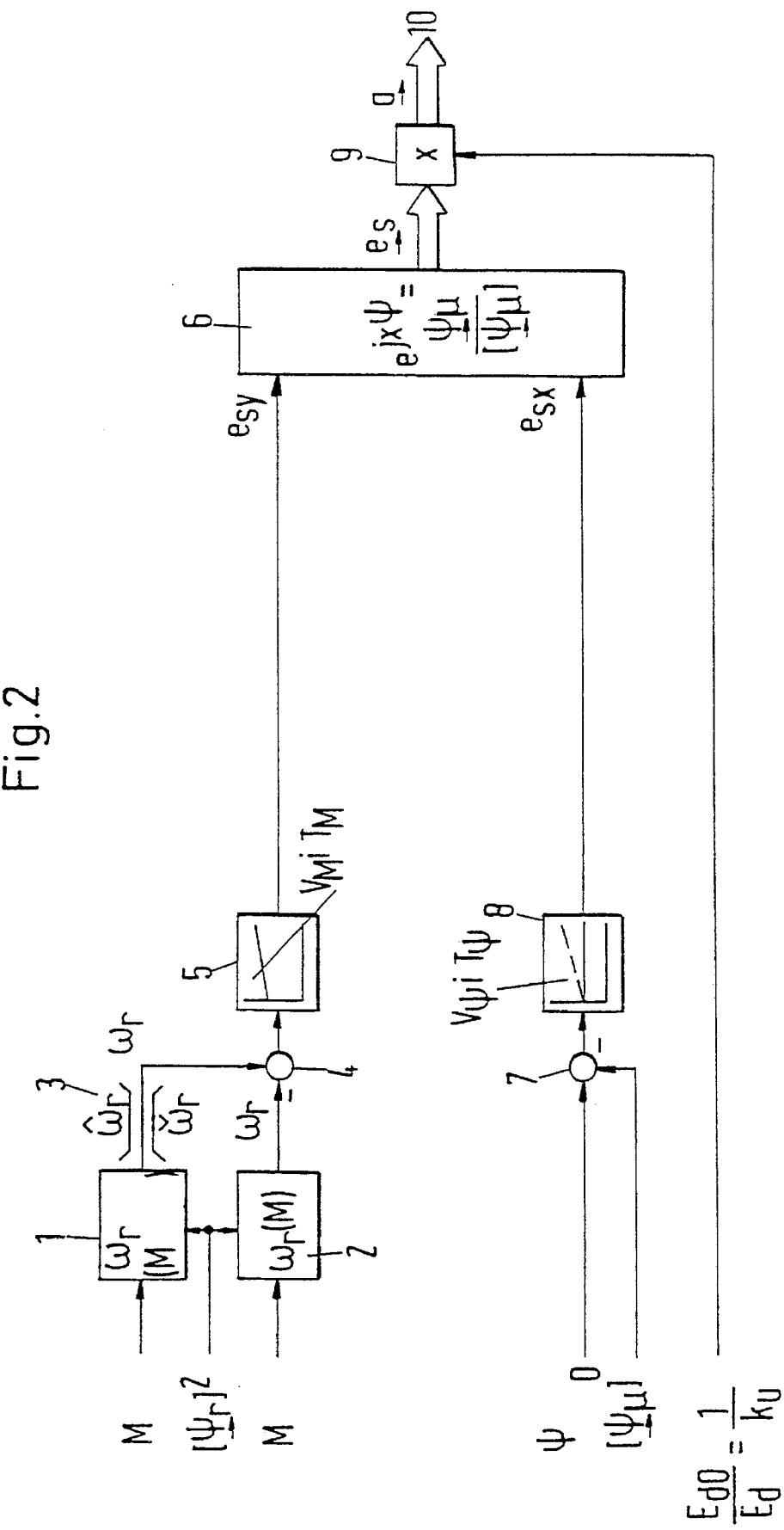

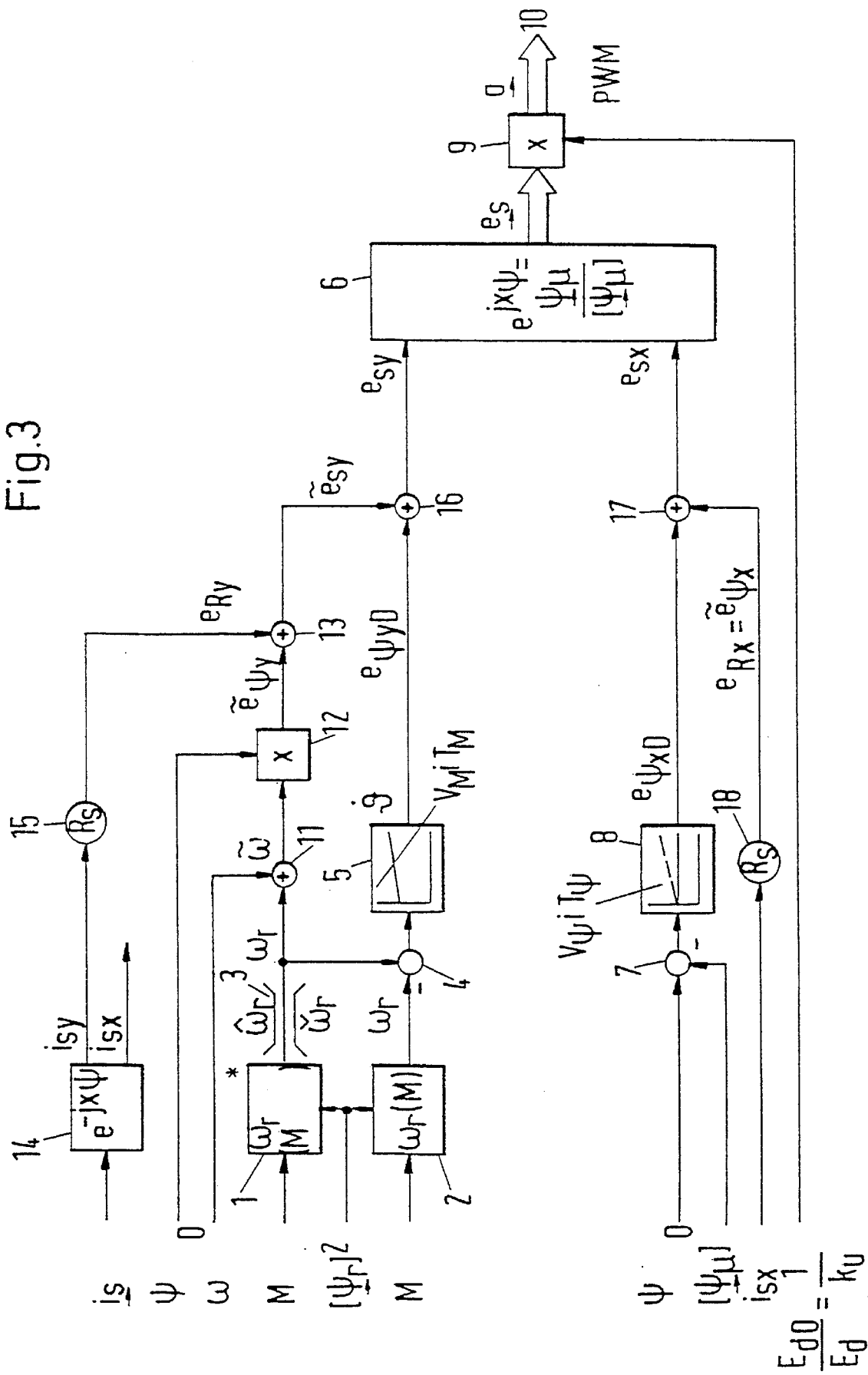

METHOD FOR CONTROLLING THE TORQUE OF AN ASYNCHRONOUS MACHINE

BACKGROUND OF THE INVENTION

Field of the Invention

The invention relates to a method for controlling the torque of a squirrel-cage rotor asynchronous machine supplied by an inverter driven by pulse-width modulation, and can be used both generally in industrial drives and, in particular, in electric rail-bound vehicles.

The aim of virtually all drive control systems is to correct the actual torque value M of the induction machine as quickly as possible to its desired torque value $M_{des}$. The torque per pole pair p of the induction machine can be calculated, for example, from the absolute values of the space vector of the total flux $|\underline{\Psi}_u|$ and the rotor flux $|\underline{\Psi}_r|$ as well as from the flux angle $\theta$ enclosed by the space vectors in accordance with $$\frac{M}{P} = \frac{3}{2 \cdot L\sigma} \cdot |\underline{\Psi}_u| \cdot |\underline{\Psi}_r| \cdot \sin\theta \qquad (1)$$

(also see the publication etz Archiv Vol. 11 (1989), Issue 1, pages 11 to 16), wherein:

$\underline{\Psi}_u$=total flux space vector;

$\underline{\Psi}_r$=rotor flux space vector; and $L\sigma$=leakage inductance.

The space vector magnitudes used below can be calculated according to known rules from the corresponding three phase quantities (also see IEEE Transactions on Power Electronics, Vol. 3, No. 4, October 1988, pages 420 to 429). There are no practically useful measuring transducers for flux linkages, and therefore they are generally calculated from measurable quantities by means of a machine model. In steady-state operation, the rotor flux space vector moves at a virtually constant angular velocity on a circular path.

The desired torque, which is as free as possible from distortion, is reached, for example, when the total flux space vector is likewise guided at a constant angular velocity on a circular path and defines the flux angle $\theta$ with the rotor flux space vector. That is virtually ideally realizable assuming quickly switching power semiconductors, because the pulse period $$T_P = \frac{1}{2 \cdot f_T} \ll T_\sigma, T_S; T_\sigma = \frac{L_\sigma}{R_r} \qquad (2)$$

of the supply inverter is then small by comparison with the rotor leakage time constant of the machine and is also small by comparison with the stator period in the entire speed range. It holds in equation (2) that $f_T$=switching frequency of the power semiconductors;

$T_\sigma$=rotor leakage time constant;

$T_s$=stator period; and $R_r$=rotor resistance.

This permits to a good approximation the simplifying assumption that the system scanned at the pulse frequency behaves in a quasi-continuous fashion and that differentials pass over into differences in accordance with $$d/dt \iff \Delta/Tp \qquad (3)$$

It is therefore possible in the further derivations to initially assume continuous time variations for all quantities.

The rotor flux of a squirrel-cage rotor asynchronous machine can only change slowly, with the result that rapid changes in torque can be achieved in principle only by varying the absolute value of the total flux or by varying the flux angle between the total flux and the rotor flux.

In order to already make optimum use of the power section of the drive in steady-state operation, the induction machine must always generate the required torque, which is as large as possible, by means of the minimum stator current in conjunction with the maximum absolute value of the stator voltage, that is to say in accordance with the maximum possible absolute value of the total flux. However, the maximum absolute value of the total flux must be limited to the rated flux $\psi_o$ with regard to the saturation of the stator iron.

All that thus remains is the possibility of adjusting the torque dynamically through the flux angle. The stator angular frequency $\omega_S$, at which the electric quantities in the stator windings of the induction machine oscillate, corresponds in steady-state operation to the sum of the electrically effective angular velocity $\omega$ of the rotor with respect to the stator and the rotor angular frequency $\omega_r$ (rotor frequency, for short), at which the electric quantities in the rotor oscillate. For the purpose of dynamic torque adjustment, the stator angular frequency of the three-phase voltage system fed into the stator windings (stator frequency, for short) must additionally contain a dynamic component $\dot{\theta}$ which is proportional to the rate of change of the flux angle $\theta$. The stator frequency is obtained in accordance with the equation $$\omega_S = \omega + \omega_r + \dot{\theta} = \overline{\omega}_S + \dot{\theta} \qquad (4)$$

wherein $\overline{\omega}_S$=steady-state stator frequency.

The electrically effective angular velocity $\omega$ of the rotor with respect to the stator (designated below as the electric speed, for short) is given by the product of the pole pair number p and the mechanical angular velocity (angular frequency) $\Omega$ of the rotor in accordance with $$\omega = p \cdot \Omega \qquad (5)$$

If the rotor resistance and the square of the absolute value $|\underline{\Psi}_r|^2$ of the rotor flux, which is easy to calculate, are known, the rotor frequency is determined uniquely by the torque in accordance with $$\omega_r = \frac{2 \cdot R_r}{3} \cdot \frac{M}{|\underline{\Psi}_r|^2} \qquad (6)$$

The aim of all known torque controls for induction machines is to set the stator frequency specified in equation (4) in such a way that the torque follows its desired value with as good dynamics as possible, and the desired and actual torques correspond in the steady-state case.

Three-phase drives fed by pulsed inverters are increasingly being used to achieve that object. They are often fitted with so-called "field-oriented control". However, that control concept has the following disadvantages:

1. Implementing the control in a coordinate system oriented along the rotor flux space vector requires two very complicated coordinate transformations, since measured quantities that are required are always present in fixed coordinates. The desired phase voltages for the pulse-width modulation (PWM) driving the supply pulsed inverter must likewise be present in fixed coordinates. In order to provide for the coordinate transformation into the selected reference system being fixed with respect to the rotor flux, the angle ε of rotor rotation, which is determined as a rule as the integral of the speed of the rotor with respect to the stator, must be very precisely determined in common with the angular position $\epsilon_r$ of the rotor flux space vector $\vec{\psi}_r$ relative to the rotor $\epsilon_r = \int \omega_r dt$. In that case integration errors easily lead to unstable behavior, particularly given a high speed. Furthermore, it is necessary for the trigonometric functions of sin and cos to be calculated sufficiently accurately from the transformation angle, and as a rule that requires a comprehensive sin/cos table to be filed in the data memory.

2. Good torque dynamics is achieved only given adequate control reserve for the stator voltage amplitude, that is to say the stator voltage amplitude cannot already be at a maximum in steady-state operation. The steady-state use of the drive is therefore not optimum.

3. The setting of the absolute value of the total flux as a function of the working point, which is necessary in principle in field-weakening operation because of the technically limited stator voltage amplitude, is carried out in a controlled fashion, with the control laws being based on complicated calculations. They are therefore not present as a rule in closed form, and can be implemented approximately on microcontrollers only in a very complicated fashion, for example by the characteristic curves.

4. There is so far no known strategy in coordinates being fixed with respect to the rotor flux for dynamic torque adjustment without control reserve of the stator voltage amplitude, with the result that no satisfactory torque dynamics is achieved, in particular in the field-weakening range.

Due to the representation in fixed coordinates, to be sure the method presented in the publication etz Archiv Vol. 11 (1989), Issue 1, pages 11 to 16 does circumvent the transformations into coordinates being fixed with respect to the rotor flux, which are named above under number 1 as a disadvantage.

However, the following disadvantages remain: The setting of the absolute value of the total flux, which is listed above under number 3, is carried out in the field-weakening range by a PI controller. Although the calculation of the control characteristic curves is thereby eliminated, good torque dynamics is only achieved in the case of that method as well with a large control reserve of the stator voltage amplitude.

It is furthermore disadvantageous that the transient response of the control is decisively determined by the integral component of the torque controller. That is unavoidable in the case of the strategy selected there, since the integral component of the torque controller in steady-state operation must always correspond to the steady-state stator frequency $\bar{\omega}_s$ in accordance with equation (4). It assumes large values in the case of a high speed, with the result that the integral component cannot be limited. Undesired transient phenomena therefore occur in the case of dynamic changes in the operating point.

Furthermore, the voltage drop across the stator resistance $R_s$ is not explicitly taken into account, with the result that it must likewise be implicitly contained in the integral components of the torque controller and the controller of the absolute value of the total flux.

SUMMARY OF THE INVENTION

It is accordingly an object of the invention to provide a method for controlling the torque of an asynchronous machine, which overcomes the hereinafore-mentioned disadvantages of the heretofore-known methods of this general type and which guarantees highly dynamic torque control in the entire speed range of a heavy-duty rotating-field drive.

With the foregoing and other objects in view there is provided, in accordance with the invention, a method for controlling the torque of a squirrel-cage rotor asynchronous machine supplied by an inverter driven by pulse-width modulation, which comprises:

converting a desired torque value ($M_{des}$) and an actual torque value (M) in accordance with $$\omega_{rdes} = \frac{2R_r}{3} \cdot \frac{M_{des}}{|\Psi_r|^2}$$

and $$\omega_r = \frac{2R_r}{3} \cdot \frac{M}{|\Psi_r|^2}$$

into a corresponding desired value ($\omega_{rdes}$) of a rotor angular frequency and a rotor angular frequency ($\omega_r$); and controlling the torque through a rotor frequency controller and a controller of an absolute value of a total flux in accordance with $$e_{sy} = V_M \cdot (\omega_{rdes} - \omega_r) + \frac{1}{\tau_M} \cdot \int (\omega_{rdes} - \omega_r) dt$$

and $$e_{sx} = V_\Psi \cdot (\Psi_{des} - |\underline{\psi}\mu|) + \frac{1}{\tau_\Psi} \cdot \int (\Psi_{des} - |\underline{\psi}\mu|) dt$$

wherein $R_r$=rotor resistance;

$\underline{\psi}_r$=rotor flux space vector;

$e_{sy}$=stator frequency factor;

$e_{sx}$=flux correction factor;

$V_M$, $v\psi$=P gains of the controllers;

$\tau_M$, $\tau_W$=reset times of the controllers;

$W_{des}$=desired value of total flux; and $\underline{W}_\mu$=total flux space vector.

The advantages which can be achieved with the invention are, in particular, that as a consequence of the indirect torque control by means of rotor frequency control, optimum steady-state use of the machine and very good control dynamics (torque dynamics) are simultaneously achieved without the need in this case for complicated computer operations. Despite the renunciation of any dynamic control reserves of the inverter drive (| $\underline{a}$ |=1=const., see equation (16)), there is a controlled approach to the torque without transient phenomena (overshooting).

The renunciation of the dynamic control reserve of the stator voltage amplitude (no voltage control reserve, that is to say always the maximum possible stator voltage amplitude) permits the induction machine to be supplied with a maximum stator voltage amplitude as early as in steady-state operation. As a result, the required torque is generated by means of the minimum stator current, and the power section is used optimally without dynamic loss;

It is noteworthy that during the dynamic phenomena the absolute value of the stator current exhibits no appreciable increase by comparison with the steady-state operation. This means that there is no need for the power section to be overdimensioned despite the good dynamics with respect to the current.

The protective measures of stability protection and current limitation which are required for the heavy-duty use of the drive can be implemented in a simple way on the basis of the indirect torque control by means of rotor frequency control.

In accordance with another mode of the invention, there is provided a method which comprises carrying out a coordinate transformation with respect to the stator frequency factor and the flux correction factor in accordance with $$e^{j\chi\mu} = \frac{\underline{\psi}_\mu}{|\underline{\psi}_\mu|}$$

in order to form a stator voltage space vector ( $\underline{e}_s$) from the stator frequency factor and the flux correction factor, wherein $x_\mu$=phase angle of the total flux space vector.

In accordance with a further mode of the invention, there is provided a method which comprises forming a space vector of the inverter drive level ( $\underline{a}$ ) by multiplying the stator voltage space vector ( $\underline{e}_s$) by the reciprocal of the voltage factor $$k_u = \frac{E_d}{E_{d0}}$$

wherein:

$E_D$=intermediate circuit direct voltage; and
$E_{do}$=rated intermediate circuit direct voltage.

In accordance with an added mode of the invention, there is provided a method which comprises forming a steady-state desired value ($\overline{\omega}_{sdes}$) of the stator angular frequency from the desired value ($\omega_{rdes}$) of the rotor angular frequency and an electric speed ($\omega$), by multiplying the steady-state desired value ($\overline{\omega}_{sdes}$) of the stator angular frequency by the desired value ($\psi_{\mu des\ o}$) of the rated total flux, by summing a steady-state component ($\hat{e}_{\psi y}$) of a magnetizing voltage space vector ( $\underline{e}\ \psi$) which is thus obtained and is orthogonal to the total flux space vector with a component ($e_{RY}$) of a voltage drop ( $\underline{e}$ R) across the stator resistance which is orthogonal to the total flux space vector, and by adding a steady-state stator frequency factor (êsy) which is thus obtained to the dynamic stator frequency factor component ($\dot{\theta}$=$e_{\psi yD}$) formed by the rotor frequency controller.

In accordance with an additional mode of the invention, there is provided a method which comprises adding a component of the voltage drop ( $\underline{e}_R$) across the stator resistance which is parallel to the total flux space vector as a steady-state flux correction factor ($e_{Rx}$) to a dynamic flux correction factor component ($e_{\psi xD}$) formed by the controller of the absolute value of the total flux.

In accordance with yet another mode of the invention, there is provided a method which comprises forming the steady-state absolute value (| $\tilde{\underline{e}}_s$|) of the stator voltage space vector from the steady-state stator frequency factor ($\tilde{e}_{sy}$) and the steady-state flux correction factor ($e_{Rx}$), by forming a steady-state field-weakening number ($\gamma$) in accordance with $$\tilde{\gamma} = \frac{1}{|\underline{\tilde{a}}|} = Ku \cdot \frac{\hat{e}_o}{|\underline{\tilde{e}}_s|}$$

by limiting the field-weakening number to values of less than one, and by multiplying the desired value ($\psi_{des\ o}$) of the rated flux by the limited field-weakening number, wherein:

ê$_0$=rated stator voltage; and $\tilde{a}_s$=steady-state space vector of the inverter drive level In accordance with yet a further mode of the invention, there is provided a method which comprises multiplying the steady-state field-weakening number ($\gamma$) by a dynamic field-weakening number $\gamma_D$=1–$V_{M\psi}\cdot e_{\psi yD}$, wherein $V_{M\psi}$=P gain.

In accordance with yet an added mode of the invention, there is provided a method which comprises limiting the absolute value of the voltage angle ($\delta_u$) between the stator voltage space vector ( $\underline{e}_s$) and the total flux space vector ( $\underline{\psi}_\mu$) rotated by +90° to approximately 60°.

In accordance with yet an additional mode of the invention, there is provided a method which comprises carrying out current limitation by limiting the desired value of the rotor angular frequency to $$\omega_{rMax} = +\frac{R_r}{L_\mu + L_\sigma} \cdot \sqrt{\frac{|\underline{i}_s|_{Max}^2 \cdot L_\mu^2}{|\underline{\psi}_r|^2} - 1}$$

in motor operation, and to $$\omega_{rMin} = -\frac{R_r}{L_\mu + L_\sigma} \cdot \sqrt{\frac{|\underline{i}_s|_{Max}^2 \cdot L_\mu^2}{|\underline{\psi}_r|^2} - 1}$$

in generator operation, wherein:

$L_\mu$=magnetizing inductance;
$L_\sigma$=leakage inductance; and
| $\underline{i}_s$|$_{Max}$=given limit of the absolute value of the stator current space vector.

In accordance with a concomitant mode of the invention, there is provided a method which comprises providing stability protection by limiting the steady-state rotor frequency ($n_r$) referred to the reciprocal of the rotor leakage time constant in a steady-state fashion in motor operation to a constant upper limiting value ($\hat{n}_{rm}$) at which limiting characteristic curves for operation at maximum stator current (ly$_{\to s}$|$_{Max}$) and operation at maximum torque ($\hat{m}$) intersect, and limiting the steady-state rotor frequency ($n_r$) referred to the reciprocal of the rotor leakage time constant in a steady-state fashion in generator operation to a constant lower limiting value ($\check{n}_{rm}$) at which limiting characteristic curves for operation at maximum speed ($n_{Max}$) and operation at minimum torque ($\check{m}$) intersect.

Other features which are considered as characteristic for the invention are set forth in the appended claims.

Although the invention is illustrated and described herein as embodied in a method for controlling the torque of an asynchronous machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF DRAWINGS

FIG. 2 is a block circuit diagram of a torque control and a control of an absolute value of a total flux with indirect torque control by means of rotor frequency control;

FIG. 3 is a block circuit diagram of a torque control with exact stator frequency precontrol for optimum torque dynamics;

DESCRIPTION OF THE PREFERRED EMBODIMENTS

Figure 1:
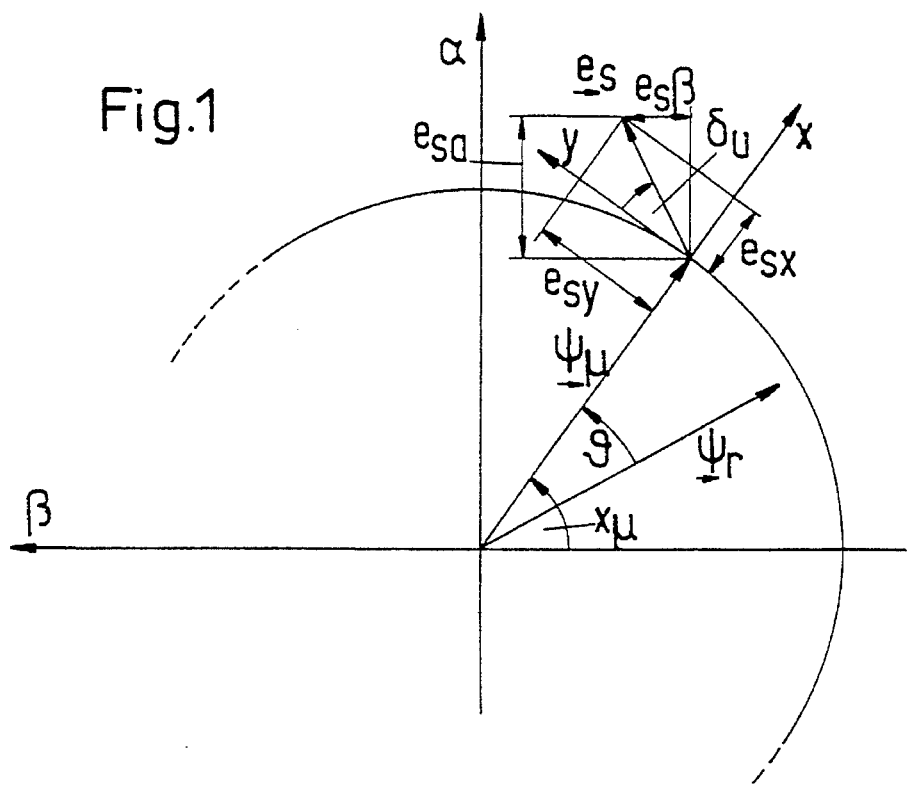
FIG. 1 is a graph showing a selected coordinate transformation using an example of a stator voltage.

Referring now to the figures of the drawing in detail and first, particularly, to FIG. 1 thereof, it is seen that a space vector $\underline{e}_s$ of a stator voltage to be applied on average per pulse period to stator terminals of an induction machine is yielded directly from a stator equation of a machine model by using an assumption made in equations 2 and 3. The stator voltage space vector is obtained as the sum of a voltage drop $\underline{e}_R$ across a stator resistance and a magnetizing voltage $\underline{e}_\psi$ which corresponds in the coordinate system that is fixed with respect to the stator to a temporal change in a total flux space vector $\underline{\psi}_\mu$, in accordance with $$\underline{e}_s = \underline{e}_R + \underline{e}_\psi = R_S \cdot i_s + \dot{\underline{\psi}}_\mu; \text{ with}(2,3): \dot{\underline{\psi}}_\mu = \frac{\Delta \underline{\psi}_\mu}{T_P} \quad (7)$$

The stator current space vector $\underline{i}_s$ can easily be measured in analog or digital form. The total flux space vector is obtained with the aid of the stator equation of the machine model in accordance with $$\underline{\psi}_\mu = \int (\underline{e}_s - R_s \cdot \underline{i}_s) dt = |\underline{\psi}_\mu| \cdot e^{j\chi_\mu} \quad (8)$$

Its phase angle $\chi_\mu$ corresponds in this case directly to the transformation angle which is required for the transformation into coordinates that are fixed with respect to the total flux and for which in accordance with equation (8) the following simple relationship holds:

$$e^{j\chi_\mu} = \frac{\underline{\psi}_\mu}{|\underline{\psi}_\mu|} \quad (9)$$

The coordinate transformation which is selected in this case is represented in FIG. 1 by using the example of the stator voltage $\underline{e}_s$ for the purpose of illustration:

α,β=fixed coordinates x,y=coordinate axes oriented along the total flux and rotating with $\underline{\psi}_\mu$ $\delta_u$=voltage angle between $\underline{e}_s$ and $\underline{\psi}_\mu$ rotated by +90°.
The following simple transformation equation holds:

$$\underline{e}_s = e_{s\alpha} + j \cdot e_{s\beta} = \underline{e}_{sx,y} \cdot e^{j\chi_\mu} = (e_{Sx} + j \cdot e_{sy}) \cdot e^{j\chi_\mu} \quad (10)$$

with it being the case that $e_{s\alpha}, e_{s\beta}$=coordinates of $\underline{e}_s$ in the α/β system, and $e_{sx}, e_{sy}$=coordinates of $\underline{e}_s$ in the x/y system.

Differentiation of the total flux space vector calculated in equation (8) and substitution of the result in the stator equation (7) leads with $\dot{x}_\mu = \omega_S$, to the following conditional equation for the stator voltage $\underline{e}_s$ to be set:

$$\underline{e}_s = \underline{e}_R + [|\dot{\underline{\psi}}_\mu| + j\omega_S|\underline{\psi}_\mu|] \cdot \frac{\underline{\psi}_\mu}{|\underline{\psi}_\mu|} = \quad (11)$$

$$[(e_{Rx} + e_{\psi x}) + j \cdot (e_{Ry} + e_{\psi y})] \cdot e^{j\chi_\mu}$$

with it being the case that $e_{Rx}, e_{Ry}$=coordinates of $\underline{e}_R$ in the x/y system and $e_{\psi x}, e_{\psi y}$=coordinates of $\underline{e}_\psi$ in the x/y system.

equation (11) contains no trigonometric functions, with the result that there is no need for a sin/cos table. Directly in evidence in this case is the splitting up, which is represented in FIG. 1, of the stator voltage into a component $e_{sx}$ parallel to the total flux space vector and a component $e_{sy}$ orthogonal thereto.

The component of the stator voltage oriented parallel to the total flux space vector varies or corrects the absolute value of the total flux. Its absolute value $e_{sx}$ is designated below as the flux correction factor.

The absolute value $e_{sy}$, which is designated as the stator frequency factor, of the component of the stator voltage orthogonal to the total flux space vector, is proportional to the stator frequency and thus enables the torque adjustment.

The simplest implementation of the torque control and control of the absolute value of the total flux is obtained when the flux correction factor $e_{sx}$ is set in accordance with the following equation (12) as the manipulated variable of a controller for the absolute value of the total flux which has a PI characteristic, and the stator frequency factor $e_{sy}$ is set in accordance with the following equation (13) by means of a PI torque controller. It holds that:

$$e_{Sx} = V_\Psi \cdot (\Psi_{des} - |\underline{\psi}_\mu|) + \frac{1}{\tau_\Psi} \cdot \int (\Psi_{des} - |\underline{\psi}_\mu|) dt \quad (12)$$

and $$e_{Sy} = V_M \cdot (M_{des} - M) + \frac{1}{\tau_M} \cdot \int (M_{des} - M) dt \quad (13)$$

with it being the case that $V_\Psi$=P gain of the controller for the absolute value of the total flux $\tau_\Psi$=reset time of the controller for the absolute value of the total flux $\Psi_{des}$=desired flux value $V_M$=P gain of the torque controller $\tau_M$=reset time of the torque controller.

As already mentioned, the I component of the torque controller is mandatory in the event of a lack of stator frequency precontrol, since it then sets the steady-state stator frequency.

The torque control and control of the absolute value of the total flux accompanied by indirect torque control by means of rotor frequency control is represented, in the way it is used to control the torque in the voltage control range (amplitude adjustment), in a block diagram in FIG. 2. Two computers 1, 2 are seen, wherein it is the case that the computer 1 receives $M_{des}$ and $|\underline{\psi}_r|^2$ and calculates a desired value $\omega_{rdes}$ of the rotor angular frequency in accordance with the equation $$\omega_{rdes} = \frac{3R_r}{2} \frac{M_{des}}{|\Psi_r|^2} \quad (6a)$$

and the computer 2 receives the torque M and $|\psi_r|^2$ and calculates the rotor angular frequency $\omega_r$ in accordance with the equation $$\omega_r = \frac{3R_r}{2} \frac{M}{|\Psi_r|^2} \quad (6)$$

A subtractor 4 forms $\omega_{rdes} - \omega_r$, with $\omega_{rdes}$ being limited previously by means of a limiter 3 to a positive or negative peak value $\omega_r$ and $\omega_r$, respectively The difference determined by the subtractor 4 is passed to a rotor frequency controller 5 (preferably a PI controller in the case of the configuration in accordance with FIG. 2) having an output signal which corresponds to the stator frequency factor $e_{sy}$, and is fed to a coordinate transformer 6.

A subtractor 7 forms the difference $\psi_{des\ 0} - |\underline{\Psi}_u|$, $\psi_{des\ 0}$ corresponding to the desired value of the rated flux, and feeds this difference to a controller 8 (preferably a PI controller in the case of the configuration in accordance with FIG. 2) of the absolute value of the total flux, having an output signal which corresponds to the flux correction factor $e_{sx}$ and is likewise fed to the coordinate transformer 6. The stator voltage space vector $\underline{e}_s$ can be taken from the coordinate transformer 6 on the output side. In order to prevent the influence of fluctuations in the direct voltage, a multiplier 9 forms the product of $\underline{e}_s$ and $$\frac{E_{d0}}{E_d} = \frac{1}{K_u}$$

with $E_d$ corresponding to the intermediate circuit direct voltage and $E_{d0}$ to the rated intermediate circuit direct voltage, and $k_u$ being defined as the voltage factor. On the output side, the multiplier 9 outputs the space vector $\underline{a}$ of the inverter drive level in a fixed $\alpha/\beta$ coordinate system to a pulse-width modulator 10 for the purpose of driving the power semiconductors of an inverter. The switching frequency of the power semiconductors is at 1 kHz or thereabove.

It is important in the case of a control in accordance with FIG. 2 that the desired value and the actual value of the torque are firstly converted in accordance with equation (6) into the corresponding rotor frequencies, and that the torque is indirectly controlled by the controller 5 through the rotor frequency in accordance with $$e_{Sy} = V_M \cdot (\omega_{rdes} - \omega_r) + \frac{1}{\tau_M} \cdot \int (\omega_{rdes} - \omega_r) dt \quad (14)$$

As is further described below, this is advantageous since stability protection and current limitation can easily be implemented by suitable limiting functions (for example, equations 30a, 30b) of the desired value $\omega_{rdes}$ of the rotor frequency.

The manipulated variables of the controllers for the absolute value of the total flux and for the rotor frequency directly generate the coordinate $e_{sx}$, which is parallel to the total flux space vector, of the stator voltage space vector (=flux correction factor) and the coordinate $e_{sy}$ (=stator frequency factor) orthogonal thereto. They implicitly contain the voltage drop across the stator resistance $R_s$. The coordinate transformation which is subsequently carried out in accordance with equation (9) and corresponds only to taking account of the actual phase angle of the total flux space vector, supplies the stator voltage space vector $\underline{e}_s$ in fixed coordinates. Finally, the stator voltage space vector is further multiplied by the reciprocal of the ratio, which is designated as the voltage factor $$k_u = \frac{E_d}{E_{d0}} \quad (15)$$

of the measured intermediate circuit direct voltage $E_d$ and the rated intermediate circuit direct voltage $E_{d0}$.

The rated intermediate circuit direct voltage $E_{d0}$ is selected for the purpose of preventing overshooting of the inverter, to the extent this is impermissible, in such a way that given a maximum sinusoidal drive level, the inverter outputs precisely the rated stator voltage $\hat{e}_0$ of the induction machine being supplied.

The space vector which is thus calculated for the inverter drive level pulse, specifically $$\underline{a} = \frac{1}{K_u} \cdot \frac{\underline{e}_s}{\hat{e}_0} \quad (16)$$

is then passed on to the pulse width modulator (PWM). Pulse width modulation methods are prior art and will not be treated further at this juncture.

A clear improvement in the torque control response by comparison with the basic version in accordance with FIG. 2 is achieved when the rotor frequency control that was previously described is supplemented by suitable precontrol of the steady-state stator frequency $\overline{\omega}_s$.

To this end, FIG. 3 represents a torque control system having exact stator frequency precontrol for optimum torque dynamics. The basic configuration is as shown in FIG. 2. The additional components of the control system are explained below.

An adder 11 sums $\omega_{des}$ and $\omega$ and feeds the steady-state desired value $\overline{\omega}_{sdes}$ of the stator angular frequency being formed in this way to a multiplier 12. The multiplier 12 calculates the steady-state component $\tilde{e}_{\psi y}$ orthogonal to the total flux space vector as the product of $\overline{\omega}_{sdes}$ and $\psi_{des\ 0}$ and feeds the latter to an adder 13 which forms the steady-state stator frequency factor $\hat{e}_{sy}$ from $e_{Ry}$ and $\tilde{e}_{\psi y}$ and feeds it to an adder 16 disposed between the rotor frequency controller 5 and the coordinate transformer 6. In order to form $e_{Ry}$ a coordinate transformer 14 is provided which calculates the components $i_{sx}$ and $i_{sy}$ of the stator current space vector in the x/y system from $\underline{i}_s$. A multiplier 15 forms a product $e_{Ry} = i_{sy} \cdot R_s$. Disposed between the controller 8 for the absolute value of the total flux and the coordinate transformer 6 is an adder 17 which is fed $e_{Rx} = \tilde{e}\psi x$ as well as $e\psi xD$, and a multiplier 18 forms the product $e_{Rx} = i_{sx} \cdot R_s$.

It is important in the case of the stator frequency precontrol in accordance with FIG. 3 that it is based on simple analytical equations which can be solved exactly on signal processors under real-time conditions. Firstly, the desired value of the steady-state stator frequency $\overline{\omega}_{s\ des}$ is determined in accordance with equation (4) as the sum of the electric speed x and the desired value $x_{rdes}$ of the rotor frequency which is calculated in accordance with equation (6) from the desired torque value.

Multiplying the steady-state desired value of the stator frequency by the desired value $\psi_{\mu des\ 0}$ of the rated total flux, with the aid of equation (11), directly yields the component $\tilde{e}_{\psi y}$ of the magnetizing voltage space vector which is to be set in steady-state operation with a constant absolute value of the total flux and is orthogonal to the total flux space vector.

Furthermore, the component $e_{Ry}$, which is orthogonal to the total flux space vector, of the voltage drop across the stator resistance, is added to this, with the result being the steady-state value of the component $\tilde{e}_{sy}$, orthogonal to the total flux space vector, of the stator voltage (=steady-state stator frequency factor). The coordinate transformation of the stator current space vector $\underline{i}_s$ carried out for this purpose corresponds only to multiplication by the conjugate complex total flux space vector $\psi_{\rightarrow\mu}$ and subsequent division by the absolute value $|\psi_{\rightarrow\mu}|$ of the total flux. These operations can be carried out exactly at little expense on a signal processor even under real-time conditions.

The rotor frequency controller now supplies, as a manipulated variable, only the dynamic component $\dot{\theta}$ of the stator frequency (=dynamic stator frequency factor component) required to change the flux angle. The component vanishes in steady-state operation, and the I component of the rotor frequency controller can theoretically be dropped, since the stator frequency is exactly precontrolled in a steady-state fashion. In practice, however, it corrects precontrol errors which can be caused by mistuning of the model parameters or measuring errors.

However, the latter are so small that the I component can be limited to very small values and has no further influence on the dynamic torque control response. The torque can thereby be controlled very quickly and without overshooting.

It is also consistent to precontrol the absolute value $e_{Rx}$ of the component, which is parallel to the total flux space vector, of the voltage drop across the stator resistance, because the controller of the absolute value of the total flux is then likewise unloaded in a steady-state fashion and can be constructed as a simple P controller. It engages only when the absolute value of the total flux is to be varied.

In the case of an unlimited absolute value of the stator voltage space vector, the machine could be operated with the rated flux $\hat{\psi}_0$ in the entire operating range. Due to the arbitrarily high control reserve of the stator voltage amplitude, it would then be possible to use the previously described control of the absolute value of the rotor frequency and the total flux continuously to achieve very good torque dynamics independently of the speed.

However, this is not the case in practice, since the rated value of the stator voltage $\hat{e}_0$ cannot be exceeded.

The equations (11, 16) make it clear that in the case of a fully driven inverter ($|\underline{a}|=1$) the rated flux can be maintained only up to a rated frequency of $$\omega_0 = k_u \cdot \frac{\hat{e}_0}{\hat{\psi}_0} \qquad (17)$$

even neglecting the voltage drop $e_R$ across the stator resistance. The rated frequency is fixed by the rated flux $\hat{\psi}_0$ and the rated voltage $\hat{e}_0$ of the machine as well as the voltage factor $k_u$.

In order to nevertheless set higher stator frequencies than the rated frequency $\omega_0$, the total flux must be weakened in accordance with the so-called field-weakening number $$\Psi = \frac{|\psi_{\rightarrow\mu}|}{\hat{\psi}_0} \qquad (18)$$

in such a way that the stator frequency amplitude which is then required is achieved precisely with a fully driven inverter. As a result, the power section of the drive is already optimally used in steady-state operation.

The torque control system by means of secondary control of the absolute value of the total flux (dynamic field-weakening) which is described below proceeds directly from the fact that in the field-weakening range the machine is continuously supplied with the maximum constant stator voltage amplitude. It then holds for the stator voltage space vector that $$\underline{e}_s = j \cdot \hat{e}_0 \cdot e^{j\delta_u} \cdot e^{j\chi\mu} \qquad (19)$$

Its absolute value corresponds to the rated value, and only the voltage angle $\delta_u$, which is represented in FIG. 1, between the space vector of the stator voltage and the total flux space vector rotated by +90° can be adjusted. The voltage angle $$\delta_u = \operatorname{atan} \frac{e_{Sx}}{|e_{sy}|} \qquad (20)$$

is given directly by the ratio of the stator voltage coordinates.

If the inverter is already fully driven in steady-state operation, in principle there is no dynamic control reserve of the stator voltage amplitude which is available, and the path velocity of the total flux space vector can no longer be increased.

In order to even more quickly increase the torque under these conditions, the flux angle $\theta$ between the total flux space vector and the rotor flux space vector in accordance with equation (1) must be quickly increased in another way. The high rate of change $\dot{\theta}$ of the flux angle which is required for this purpose can only be achieved in the case of a constant path velocity of the total flux space vector by suitably shortening the total flux path curve.

Figure 4:
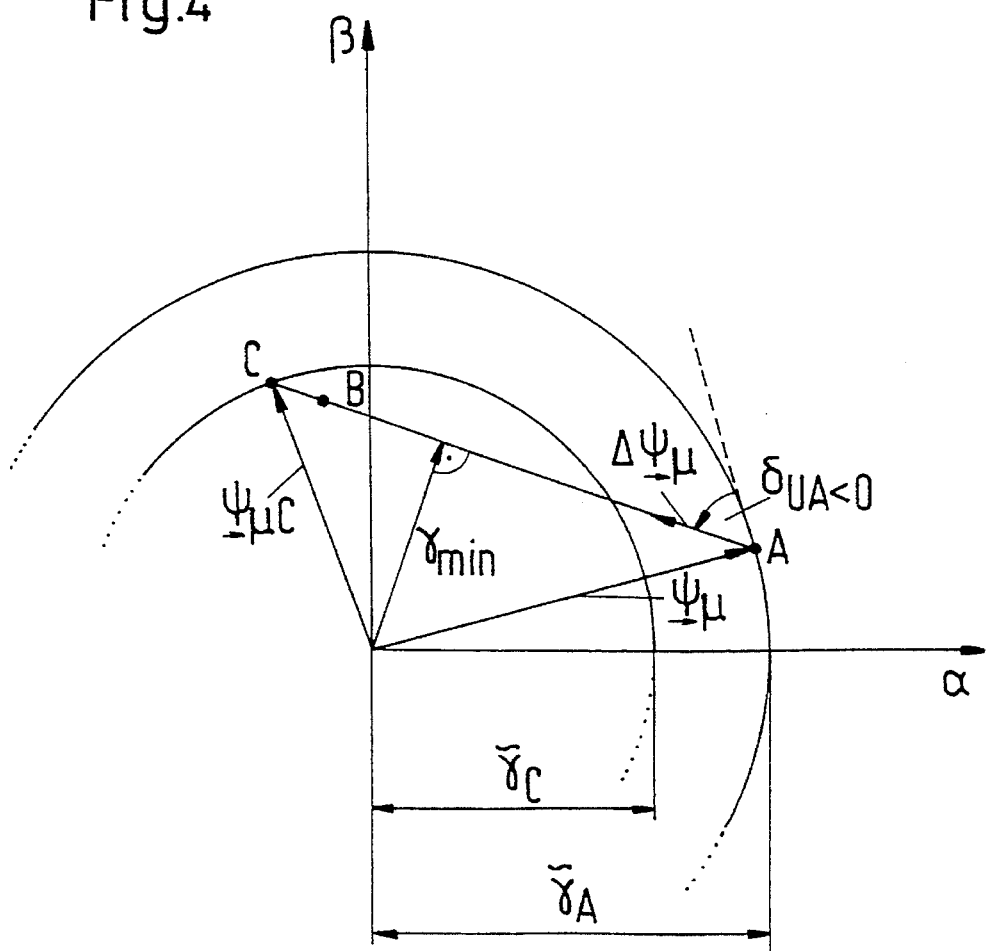
FIG. 4 is a graph showing a path curve of a total flux space vector in field-weakening operation in the case of changing from a steady-state operating point to a new point with a higher torque.

In order to explain this process, by way of example FIG. 4 shows the path curve of the total flux space vector in field-weakening operation in the case of a change from a steady-state operating point to a new one with a higher torque, wherein $\overline{\gamma}_C$=steady-state field-weakening number at point C, $\overline{\gamma}_A$=steady-state field-weakening number at point A, $\underline{\psi}_{\mu C}$=total flux space vector at point C, $\gamma_{min}$=field-weakening number minimum $\Delta\underline{\psi}_\mu$=total flux space vector increase relative to point A Due to the increased torque and the higher stator frequency required therefor, the circumference of the new steady-state circular path of the total flux reached at point C is smaller than in the case of the old circular path left at point A.

The transition between the operating points A, C is carried out at optimum speed when the total flux space vector at point A is guided onto the linear connection, which is selected as the shortest possible dynamic path curve, between points A and C by suddenly reducing the voltage angle $\delta_u$ to a negative value. The reduction in the voltage angle is achieved in accordance with equation (20) by reducing the component $e_{sx}$ of the stator voltage parallel to the total flux space vector.

While the total flux space vector traverses the shortening path, the rotor flux space vector remains approximately on its steady-state path curve, which is traversed at a virtually unchanged angular velocity. In this case, the flux angle $\theta$ is increased essentially by the path shortening alone, and the torque rises. The voltage angle is increased again with decreasing torque control system deviation. Once the torque reaches its desired value, for example as early as at point B, the stator voltage amplitude is suddenly reduced in such a way that the torque does not overshoot.

While the total flux space vector then extends further into the point C, the drive level and the absolute value of the total flux are adjusted in such a way that the torque corresponds to the desired value. Finally, once the total flux space vector reaches its new steady-state circular path at point C, the absolute value of the total flux is no longer varied. Linear component $e_{sx}$ of the stator voltage space vector that is parallel to the total flux space vector becomes very small and, in accordance with equations (19, 20), the stator voltage space vector is once again virtually perpendicular to the total flux space vector. The voltage angle $\delta_u$ thus again approximately reaches the value zero, because $\delta_u$ assumes a small positive final value in order to cover the voltage drop across the stator resistance.

A bending-off angle $\delta_{uA}$ at point A determines how quickly the torque rises. In accordance with equation (20), it can theoretically assume values up to 90°, with the result that the total flux space vector would then be guided directly through the origin, starting from point A in FIG. 4. The machine would then be de-excited and no more torque would be present.

This effect is avoided if the absolute value of the voltage angle is limited to approximately $\delta_u = 60°$. In accordance with equation (20), the limitation of the voltage angle can easily be realized by observing the condition $$|e_{sx}| \leq \tan 60° \cdot |e_{sy}| \qquad (21)$$

The limiting value is selected in such a way that the average rate of rise of the torque is a maximum.

Figure 5:
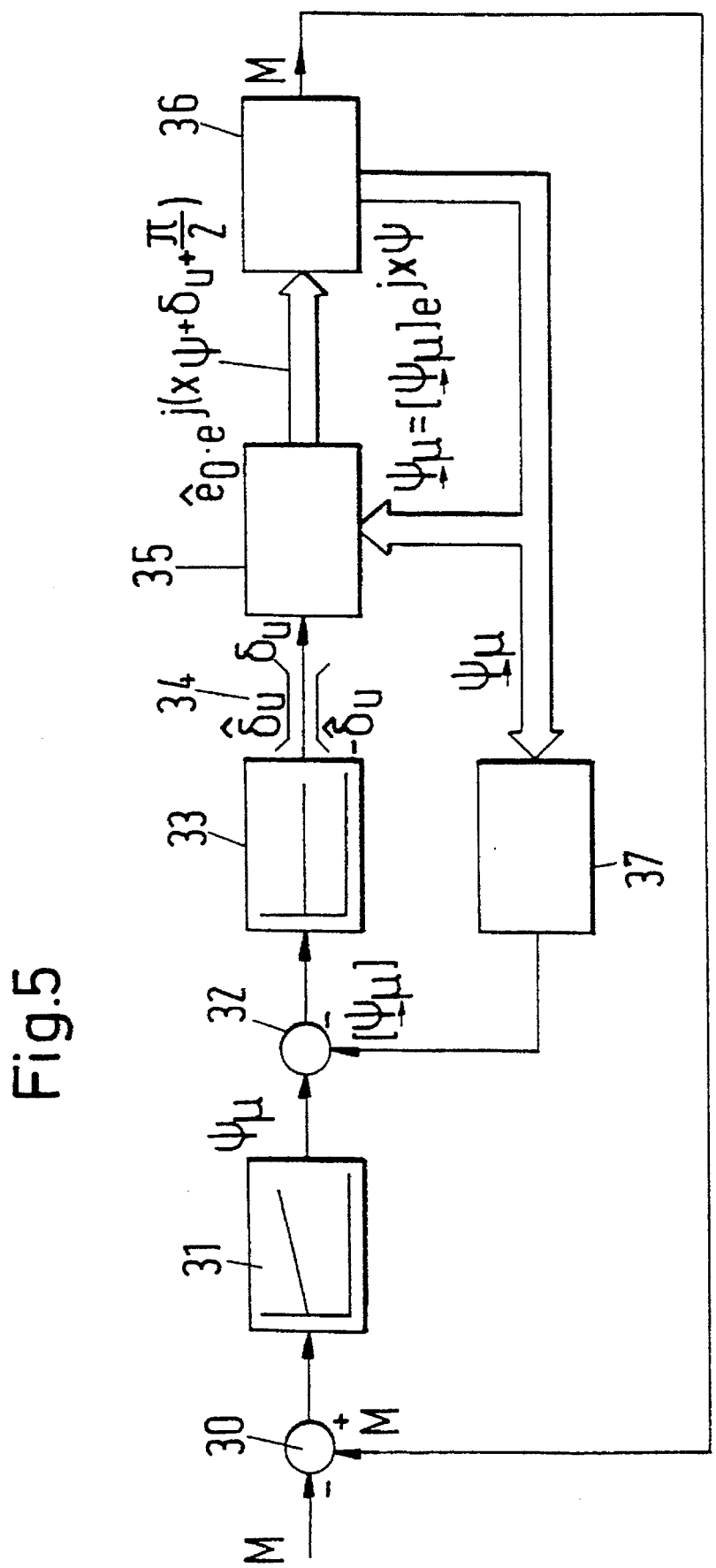
FIG. 5 is a block circuit diagram of a basic structure of the torque control by means of underlying control of the absolute value of the total flux.

FIG. 5 shows the basic structure of torque control effected by secondary control of the absolute value of the total flux. A subtractor 30 forms a signal $M - M_{des}$ and feeds this difference to a torque controller 31. A further subtractor 32 forms the difference $\psi_{\mu des} - |\underline{\Psi}_\mu|$ to be fed to a controller 33 of the total flux, from the desired value $\psi_{\mu des}$ of the total flux which is present at the output of the controller 31 and the absolute value of the total flux space vector $|\underline{\Psi}_\mu|$. On the output side, the controller 33 outputs the voltage angle $\delta$, which is limited with the aid of a limiter 34 to a positive and negative maximum value $\hat{\delta}u$, $-\hat{\delta}u$, and is received by a coordinate transformer 35. The output signal $$\hat{e}_0 \cdot e^{j(x_\psi + \delta u + \frac{\pi}{2})}$$

of the coordinate transformer 35 is fed to a machine model 36, which from this forms the torque M and the total flux space vector $\underline{\Psi}_\mu = |\underline{\Psi}_\mu| e^{jx_\psi}$. $\underline{\Psi}_\mu$ is fed to the coordinate transformer 35 and an absolute-value generator 37, with the latter forming the quantity $|\underline{\Psi}_\mu|$ and directing it to the subtractor 32.

The primary torque controller 31 with the PI characteristic corrects the torque to its desired value by prescribing the radius of the total flux path curve for the secondary controller 33 of the absolute value of the total flux, which has a P characteristic. The manipulated variable of the controller 33 of the absolute value of the total flux corresponds to the voltage angle $\delta_u$ which is defined in equation (20) and is limited in accordance with equation (21). The stator voltage space vector is given uniquely in accordance with equation (19) by the voltage angle $\delta_u$ and the angular position $X_\psi$ of the total flux space vector. All of the variables required for control are provided by the machine model 36.

A good torque control response is achieved without dynamic control reserve of the stator voltage amplitude by means of the basic structure described above.

If the desired torque value is discontinuously increased from idling to the maximum achievable torque for the given speed, the torque follows the desired value despite a constant stator voltage amplitude with good dynamics. The total flux space vector is guided suddenly onto a shortening path which is initially virtually linear. However, due to the linear controller used for the torque and absolute value of the total flux, the shortening path does not remain linear, but closely follows the new steady-state circular path in the case of decreasing system deviation. Its length is therefore not a minimum and the control time is correspondingly somewhat longer than theoretically possible.

Once the torque reaches its desired value, it overshoots without a further measure, because the desired value of the total flux set at this instance by the integral component of the torque controller is still too small.

In order to prevent overshooting of the torque, the stator voltage amplitude, and thus the path velocity of the total flux space vector, must and can be suddenly reduced at the instant at which the torque reaches its desired value. The way in which the stator voltage amplitude can be reduced is described with reference to FIG. 6.

Figure 6:
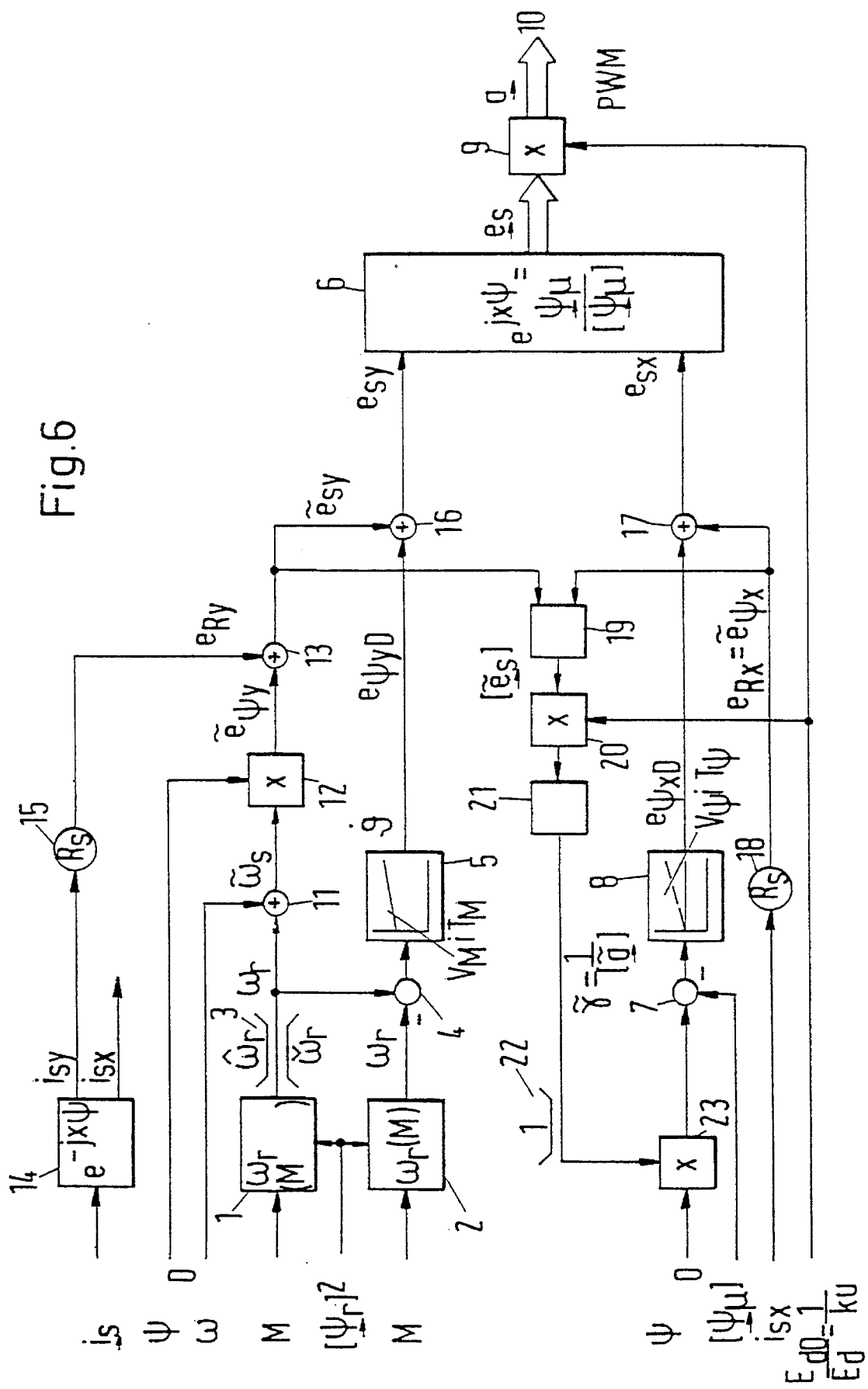
FIG. 6 is a block circuit diagram of a torque control with exact precontrol of the absolute value of the total flux and voltage amplitude adjustment.

A torque control system with exact precontrol of the absolute value of the total flux and adjustment of the voltage amplitude is represented in FIG. 6. The basic structure is as described with reference to FIGS. 2 and 3. The signals $\hat{e}_{Rx} = \hat{e} \psi x$ and $\hat{e}_{sy}$ are fed to an absolute-value generator 19 which from this forms the steady-state absolute value $|\hat{e}_s|$ of the stator voltage space vector. A multiplier 20 generates the product of $|\hat{e}_s|$ and $1/ku$ and feeds the latter to a reciprocal-value generator 21. The steady-state field-weakening number $$\bar{\gamma} = \frac{1}{\left|\vec{\alpha}\right|}$$

which can be tapped at the output of the reciprocal-value generator 21 is limited with the aid of a limiter 22 to values less than or equal to 1 and is fed to a multiplier 23 ($|\underline{a}|$ = steady-state absolute value of the space vector of the inverter drive level). The multiplier forms the product of $\psi_{des\ 0}$ and the steady-state field-weakening number $\bar{\gamma}$ that is limited to one and feeds the latter to the subtractor 7.

It has already been shown above that the dynamic response of a control system is substantially improved if the integral components of the controllers are replaced by suitable precontrols. Consequently, the absolute value of the total flux, which is set in a steady-state fashion in the basic structure by the I channel of the torque controller, is exactly precontrolled by means of the additional measures according to FIG. 6.

Firstly, the absolute value $|\underline{a}|$ of the inverter drive level in accordance with equation (16) is calculated for the case in which it would be possible to achieve the desired steady-state stator frequency while maintaining the rated flux. The reciprocal of this absolute value of the drive level is subsequently set as the steady-state field-weakening number $\gamma$ in accordance with $$\bar{\gamma} = \frac{1}{\left|\vec{\alpha}\right|} = ku \cdot \frac{\hat{e}_0}{\left|\vec{e}_s\right|} \qquad (22)$$

The result of this is that the required stator frequency is achieved precisely with maximum stator voltage amplitude. The subsequent limiting of the field-weakening number to values of less than 1 prevents stator frequencies below the rated frequency from being set with an impermissibly high absolute value of the total flux.

The controller 8 of the absolute value of the total flux obtains the desired value of the total flux $$\Psi_{\mu des}=\Psi_{\mu des\ 0}\cdot\overline{\gamma} \tag{23}$$

in a precontrolled fashion. It corresponds to the product of the desired value $\Psi_{des\ 0}$ of the total flux set in the voltage control range and the steady-state field-weakening number $\overline{\gamma}$ calculated in accordance with equation (22).

In the case of the control system described with reference to FIG. 6, overshooting of the torque after the desired value has been reached by suddenly reducing the stator voltage amplitude is avoided. Furthermore, because of the low outlay, the control structure which is presented can easily be realized on a signal processor even under real-time conditions.

Figure 7:
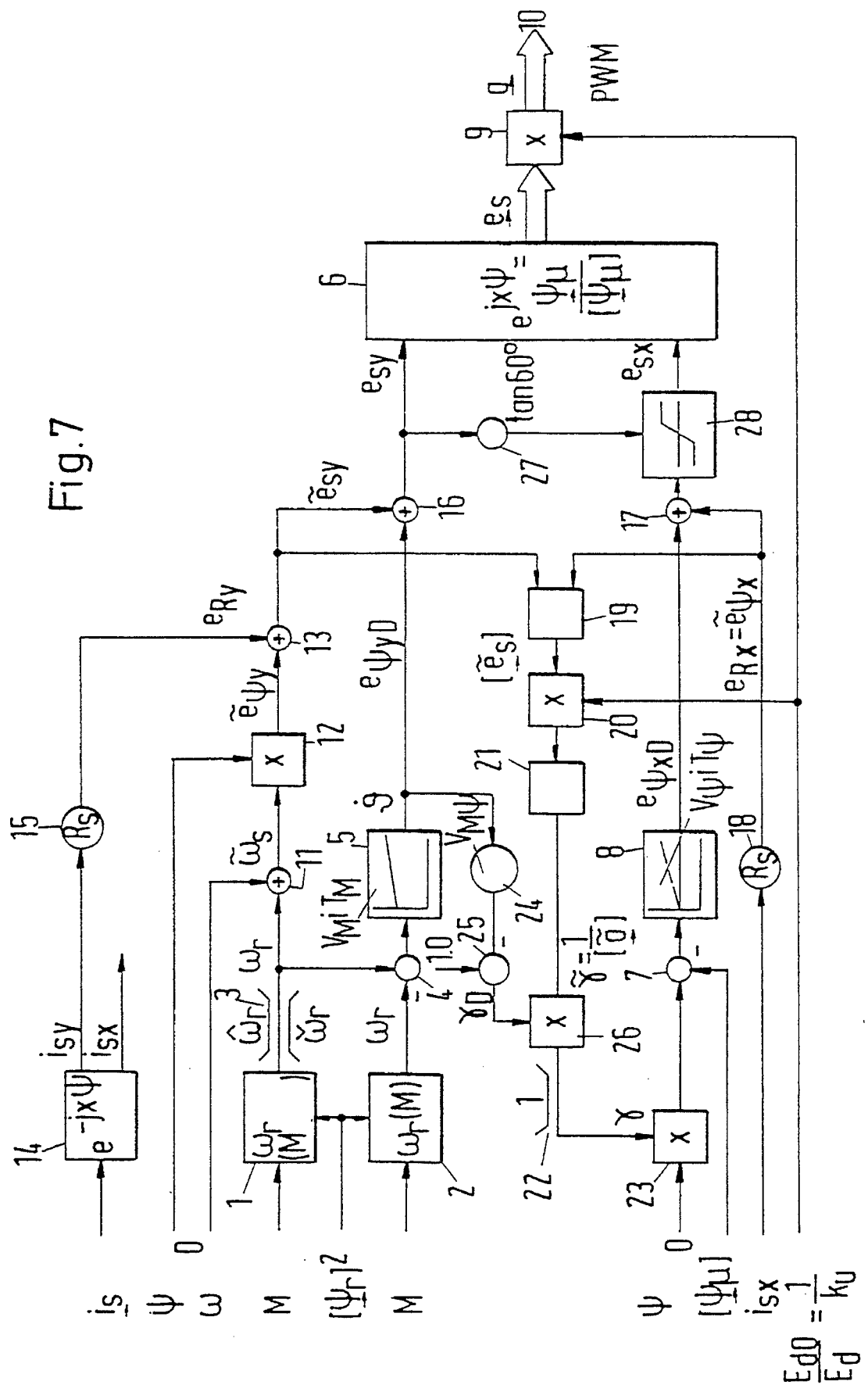
FIG. 7 is a block circuit diagram of a torque control having dynamic field weakening with a limited voltage angle.

FIG. 7 represents a torque control system with dynamic field weakening with the limited voltage angle. The basic structure is as shown with reference to FIGS. 2, 3 and 6. In addition, a proportional element 24 is provided which forms the product of $e\psi yD$ and $V_{M\psi}$ and feeds it to a subtractor 25, with $V_{M\psi}$ representing a P gain. The subtractor 25 forms a dynamic field-weakening number $\gamma_D$ by calculating the difference between 1.0 and the product of the proportional element 24. A multiplier 26 forms the product of the dynamic field-weakening number $\gamma_D$ and the steady-state field-weakening number $\overline{\gamma}$. With the aid of the limiter 22, this product is limited to 1 and passes as a field-weakening number $\gamma$ to the multiplier 23 which multiplies $\gamma$ by $\Psi_{des\ 0}$ and feeds the desired value of the flux thus formed to the subtractor 7.

A multiplier 27 forms the product of $e_{sy}$ and tan 60° and feeds this to a computing element 28. This computing element 28 realizes the condition specified in equation (21) and receives the sum signal of the adder 17 on the input side, and outputs $e_{sx}$ to the coordinate transformer 6 on the output side.

The principle of dynamic field weakening already described above is realized by using the dynamic field-weakening controller 24, 25, 26. This controller weights the field-weakening number which is precontrolled in a steady-state fashion in accordance with equation (22) with the dynamic field-weakening number $$\gamma_D=1-V_{M\psi}\cdot e_{\psi yD} \tag{24}$$

The dynamic field-weakening number is obtained directly from the manipulated variable $e\psi yD$ of the rotor frequency controller 5. The manipulated variable of the latter is weakened by the additionally inserted proportional element 24 with the P gain $V_{M\psi}$, so that the stability of the torque control loop remains guaranteed in the case of dynamic field weakening.

The torque control system, which was described with reference to FIG. 7, with voltage amplitude adjustment, is distinguished due to the fact that the torque control times which are theoretically possible given renunciation of dynamic control reserve of the stator voltage amplitude, are virtually achieved.

The good torque dynamics in the voltage control range are maintained, since the rotor frequency controller 5 can act undiminished on the amplitude of the inverter drive level. Overshooting of the torque can thereby be virtually completely avoided.

The additional P element 24 takes into account the fact that the average stator frequency per pulse period can be influenced in the voltage control range by the discontinuously adjustable absolute value of the stator voltage, but in the field-weakening range only by the continuously adjustable absolute value of the total flux.

Finally, the desired value of the total flux is obtained as the product of the desired value of the total flux which is precontrolled in accordance with equation (23) and the dynamic field-weakening number, that is calculated in equation (24), in accordance with $$\Psi_{des}=\Psi_{des\ 0}\cdot\overline{\gamma}\cdot\gamma_D \tag{25}$$

In the case of heavy-duty rotating field drives, it is imperative to take measures for current limitation and stability protection, when it is impermissible for the dynamic response of the drive to be impaired.

Suitable measures for current limitation and stability protection are specified below. In this case the approach is adopted of realizing both protection devices by suitable limitation of the desired value of the rotor frequency. This leads to solutions of low complexity which can also be processed on a signal processor under real-time conditions.

The stator current can be calculated in accordance with $$\vec{i_s}=\vec{\Psi_\mu}\cdot\left(\frac{1}{L_\mu}+\frac{1}{L_\sigma}\right)-\frac{\vec{\Psi_r}}{L_\sigma} \tag{26}$$

from the equivalent circuit diagram of the induction machine (see, for example, IEEE Transactions on Power Electronics, Vol. 3, No. 4, October 1988, pages 420 to 429, FIG. 4).

Furthermore, in steady-state operation the relationship $$\omega_r T\sigma=\tan\theta \tag{27}$$

holds between the rotor frequency and the flux angle.

The rotor flux space vector is then determined by the flux angle and the total flux space vector in accordance with $$\vec{\Psi_r}=\vec{\Psi_\mu}\cdot\cos\theta\cdot e^{-j\theta} \tag{28}$$

Using equations (26 . . . 28), the absolute value of the stator current space vector can be represented as a function of the rotor frequency and the absolute value of the rotor flux in accordance with $$\left|\vec{i_s}\right|=\frac{\left|\vec{\Psi_r}\right|}{L_\mu}\cdot\sqrt{1+\left(\frac{L_\sigma+L_\mu}{Rr}\right)^2\cdot\omega_r^2} \tag{29}$$

It becomes clear in equation (29) that a prescribed limit $|i_s|$ Max of the absolute value of the stator current is observed in the case of limitation of the rotor frequency $\omega_r$ to $$\omega_{rMax}=+\frac{R_r}{L_\mu+L_\sigma}\cdot\sqrt{\frac{\left|\vec{i_s}\right|_{Max}^2\cdot L_\mu^2}{\left|\vec{\Psi_r}\right|^2}-1} \tag{30a}$$

and

-continued $$\omega_{rMin} = -\frac{R_r}{L_\mu + L_\sigma} \cdot \sqrt{\frac{\left|\underset{\rightarrow}{i_s}\right|_{Max}^2 \cdot L_\mu^2}{\left|\underset{\rightarrow}{\Psi_r}\right|^2} - 1} \quad (30b)$$

In this case, the plus sign stands for the limitation in motor operation and the minus sign stands correspondingly for the limitation in generator operation.

The stability protection must be provided in such a way that a reversal of the control direction is reliably prevented without impairing the dynamic response of the drive. As mentioned at the beginning, the stability protection is realized by suitable limitation of the rotor frequency.

The first step for this purpose is to calculate the variation in torque as a function of the rotor frequency. It is advantageous in this case to relate the torque to the so-called rated breakdown torque per pole pair $$\frac{M_B}{p} = \frac{3}{4 \cdot L_\sigma} \cdot \hat{\psi}_0^2 \quad (31)$$

which can be achieved in a steady-state fashion to a maximum effect with the rated flux. Furthermore, frequencies are related to the reciprocal of the rotor leakage time constant $T\sigma$ in accordance with $$n = \omega \cdot T_\sigma \quad (32)$$

Substituting equations (27, 28, 31, 32) in equation (1) produces the specific torque m in conjunction with neglecting the voltage drop across the stator resistance $R_S$ as a function of the specific rotor frequency $n_r$ given a specific speed $n_0$ in accordance with $$m = \frac{n_0^2}{(n+n_r)^2} \cdot \frac{2 \cdot n_r}{1+n_r^2} \; ; \; n_0 = \omega_0 \cdot T\sigma, \; n_r = \omega_r \cdot T_\sigma \quad (33)$$

In order to realize the stability protection exactly, it is necessary to know the rotor frequencies at which the motor breakdown torque $\hat{m}$ or the generator breakdown torque $\check{m}$ occurs. For this purpose, the extreme points of equation (33) are determined by using known analytical methods such as, for example, the Cardan solution of the cubic. The result is to obtain solution functions, which contain the specific breakdown rotor frequencies $\hat{n}_r$ for the motor region and $\check{n}_r$ for the generator region as a function of the specific speed n.

The stability protection can be realized very easily by taking into account the fact that the characteristic curves of the torque rotor frequency are very flat in the vicinity of the stability limit. For this purpose, the specific steady-state rotor frequency $n_r$ is limited in a steady-state fashion in motor operation to the constant upper limiting functions of $n_r$ for operation at maximum stator current value $\hat{n}_{rm}$ at which the limiting characteristic curves as $|y_{\rightarrow s}|_{Max}$ and maximum torque $\hat{m}$ intersect. In generator operation, the specific steady-state rotor frequency $n_r$ is limited in a steady-state fashion to the likewise constant lower limiting value $\check{n}_{rm}$ at which the limiting characteristic curves for operation at maximum speed $n_{Max}$ and operation at minimum torque $\check{m}$ intersect.

Limiting the steady-state rotor frequency has no influence on the dynamic operational performance, since the manipulated variable $\delta$ of the rotor frequency controller is not limited. However, since $\delta$ vanishes in the steady-state case, this again has no influence on the stability protection.

The actual breakdown torque of the machine can be used virtually completely ($|m_{max}| > 0.99 m_{break}$) by the stability protection explained above. In the attempt to control dynamically to an excessively large desired torque, the maximum achievable torque is firstly set with unlimited dynamics. It is not until the dropping of the rotor flux that limitation of the desired value $n_{rdes}$ of the rotor frequency set to the limiting value $\hat{n}_{rm}$ is fixed in accordance with the previously described method, and the torque drops to the steady-state breakdown torque.

It is to be added to the foregoing explanations that $\underline{i}$ is generally the physical current, and $\underline{y}$ is the current that is normalized with respect to the rotor short-circuit current $I_\infty$. The rotor short-circuit current $I_\infty = \hat{W}_0/L_\delta$ would flow if the principal inductance were magnetized to the rated flux $\hat{\psi}_0$, the rotor were short circuited, and the rotor current were limited only by the rotor leakage inductance $L_\delta$. This normalization of the current leads to simple equations.

We claim:

1. A method of controlling the torque of a squirrel-cage rotor asynchronous machine supplied by an inverter driven by pulse-width modulation, which comprises:

determining a rotor resistance $R_r$, a rotor flux space vector $\underline{\Psi}_r$, and a desired torque value $M_{des}$, and determining a corresponding desired value $\omega_{rdes}$ of a rotor angular frequency, in accordance with $$\omega_{rdes} = \frac{2R_r}{3} \frac{M_{des}}{|\underline{\psi}_r|^2}$$

determining an actual torque value M and forming a rotor angular frequency $\omega_r$, in accordance with $$\omega_r = \frac{2R_r}{3} \frac{M}{|\underline{\psi}_r|^2}$$

and controlling the torque through a rotor frequency controller and a controller of an absolute value of a total flux in accordance with $$e_{sy} = V_M \cdot (\omega_{rdes} - \omega_r) + \frac{1}{\tau_M} \cdot \int(\omega_{rdes} - \omega_r)dt$$

and $$e_{sx} = V_\Psi \cdot (\Psi_{des} - |\underline{\psi}\mu|) + \frac{1}{\tau_\Psi} \cdot \int(\Psi_{des} - |\underline{\psi}\mu|)dt$$

wherein:
$e_{sy}$=stator frequency factor;
$e_{sx}$=flux correction factor;
$V_M$, $V_\Psi$=P gains of the controllers;
$\tau_M$, $\tau_\Psi$=reset times of the controllers;
$\psi_{des}$=desired value of total flux; and
$\underline{\Psi}_\mu$=total flux space vector;

forming from the stator frequency factor $e_{sy}$ and the flux correction factor $e_{sx}$ a stator voltage vector, and controlling the torque of the asynchronous machine by setting an output vector $\underline{a}$ of the inverter supplying the machine.

2. The method according to claim 1, which comprises carrying out a coordinate transformation with respect to the stator frequency factor and the flux correction factor in accordance with $$e^{jx\mu} = \frac{\vec{\Psi_\mu}}{|\vec{\Psi_\mu}|}$$

in order to form a stator voltage space vector ($\vec{e}_s$) from the stator frequency factor and the flux correction factor, wherein $x_\mu$=phase angle of the total flux space vector.

3. The method according to claim 2, which comprises forming a space vector of the inverter drive level ($\vec{a}$) by multiplying the stator voltage space vector ($\vec{e}_s$) by the reciprocal of the voltage factor $$k_u = \frac{E_d}{E_{d0}}$$

wherein:
$E_D$=intermediate circuit direct voltage; and
$E_{do}$=rated intermediate circuit direct voltage.

4. The method according to claim 1, which comprises forming a steady-state desired value ($\bar{\omega}_{sdes}$) of the stator angular frequency from the desired value ($\omega_{rdes}$) of the rotor angular frequency and an electric speed ($\omega$), by multiplying the steady-state desired value ($\bar{\omega}_{sdes}$) of the stator angular frequency by the desired value ($\psi_{\mu des\ o}$) of the rated total flux, by summing a steady-state component ($\hat{e}_{\psi y}$) of a magnetizing voltage space vector ($\vec{e}_\psi$) which is thus obtained and is orthogonal to the total flux space vector with a component ($e_{Ry}$) of a voltage drop ($\vec{e}R$) across the stator resistance which is orthogonal to the total flux space vector, and by adding a steady-state stator frequency factor ($\bar{e}sy$) which is thus obtained to the dynamic stator frequency factor component ($\theta=e_{\psi yD}$) formed by the rotor frequency controller.

5. The method according to claim 4, which comprises adding a component of the voltage drop ($\vec{e}_R$) across the stator resistance which is parallel to the total flux space vector as a steady-state flux correction factor ($e_{Rx}$) to a dynamic flux correction factor component ($e_{\psi xD}$) formed by the controller of the absolute value of the total flux.

6. The method according to claim 5, which comprises forming the steady-state absolute value ($|\tilde{\vec{e}}_s|$) of the stator voltage space vector from the steady-state stator frequency factor ($\tilde{e}_{sy}$) and the steady-state flux correction factor ($e_{Rx}$), by forming a steady-state field-weakening number ($\gamma$) in accordance with $$\bar{\gamma} = \frac{1}{|\vec{\alpha}|} = Ku \cdot \frac{\hat{e}_o}{|\vec{e}_s|}$$

by limiting the field-weakening number to values of less than one, and by multiplying the desired value ($\psi_{des\ o}$) of the rated flux by the limited field-weakening number, wherein:
$\hat{e}_0$=rated stator voltage; and
$\vec{a}$=steady-state space vector of the inverter drive level.

7. The method according to claim 6, which comprises multiplying the steady-state field-weakening number ($\gamma$) by a dynamic field-weakening number $\gamma_D=1-V_{M\psi}\cdot e_{\psi yD}$ wherein $V_{M\psi}$=P gain.

8. The method according to claim 7, which comprises limiting the absolute value of the voltage angle ($\delta_u$) between the stator voltage space vector ($\vec{e}_s$) and the total flux space vector ($\vec{\Psi}_\mu$) rotated by +90° to approximately 60°.

9. The method according to claim 1, which comprises carrying out current limitation by limiting the desired value of the rotor angular frequency to $$\omega_{rMax} = +\frac{R_r}{L_\mu + L_\sigma} \cdot \sqrt{\frac{|\vec{i_s}|^2_{Max} \cdot L_\mu^2}{|\vec{\Psi_r}|^2} - 1}$$

in motor operation, and to $$\omega_{rMin} = -\frac{R_r}{L_\mu + L_\sigma} \cdot \sqrt{\frac{|\vec{i_s}|^2_{Max} \cdot L_\mu^2}{|\vec{\Psi_r}|^2} - 1}$$

in generator operation, wherein:
$L_\mu$=magnetizing inductance;
$L_\sigma$=leakage inductance; and
$|\vec{i}_s|_{Max}$=given limit of the absolute value of the stator current space vector.

10. The method according to claim 1, which comprises providing stability protection by limiting the steady-state rotor frequency ($n_r$) referred to the reciprocal of the rotor leakage time constant in a steady-state fashion in motor operation to a constant upper limiting value ($\hat{n}_{rm}$) at which limiting characteristic curves for operation at maximum stator current ($|\vec{i}_s|_{Max}$) and operation at maximum torque ($\hat{m}$) intersect, and limiting the steady-state rotor frequency ($n_r$) referred to the reciprocal of the rotor leakage time constant in a steady-state fashion in generator operation to a constant lower limiting value ($\check{n}_{rm}$) at which limiting characteristic curves for operation at maximum speed ($n_{Max}$) and operation at minimum torque ($\check{m}$) intersect.

\* \* \* \* \*